US00RE49819E

(19) United States
(12) Reissued Patent
Bang

(10) Patent Number: US RE49,819 E
(45) Date of Reissued Patent: Jan. 30, 2024

(54) MOBILE TERMINAL AND METHOD OF CONTROLLING THE OPERATION OF THE MOBILE TERMINAL

(71) Applicant: LG ELECTRONICS INC., Seoul (KR)

(72) Inventor: Sungeun Bang, Seoul (KR)

(73) Assignee: LG ELECTRONICS INC., Seoul (KR)

(21) Appl. No.: 16/033,820

(22) Filed: Jul. 12, 2018

Related U.S. Patent Documents

Reissue of:

(64) Patent No.: 9,389,770
Issued: Jul. 12, 2016
Appl. No.: 12/972,330
Filed: Dec. 17, 2010

(30) Foreign Application Priority Data

Apr. 19, 2010 (KR) ..... 10-2010-0035987

(51) Int. Cl.
*G06F 3/0486* (2013.01)
*G06F 3/04817* (2022.01)
(Continued)

(52) U.S. Cl.
CPC ..... *G06F 3/0486* (2013.01); *G06F 3/04817* (2013.01); *G06F 3/04886* (2013.01); *G06F 3/0482* (2013.01)

(58) Field of Classification Search
CPC .. G06F 3/04817; G06F 3/0482; G06F 3/0486; G06F 3/04886
See application file for complete search history.

(56) References Cited

U.S. PATENT DOCUMENTS 7,509,588 B2 3/2009 Van Os et al.
7,954,064 B2 * 5/2011 Forstall ..... G06F 3/04817 715/779
(Continued)

FOREIGN PATENT DOCUMENTS

CN 101128793 2/2008
CN 101252746 8/2008
(Continued)

OTHER PUBLICATIONS

Korean Intellectual Property Office Application No. 10-2010-0035987, Office Action dated Feb. 11, 2016, 5 pages.
(Continued)

*Primary Examiner* — Rachna S Desai
(74) *Attorney, Agent, or Firm* — LEE, HONG, DEGERMAN, KANG & WAIMEY

(57) ABSTRACT

A method of displaying items on a mobile terminal includes displaying a first icon group of a plurality of icons on a display of the mobile terminal, such that each icon of the first icon group is associated with an application that is executable on the mobile terminal. Also performed is detecting user contact at a first location of the display relative to a displayed location of a particular icon of the first icon group and detecting further user contact representing a dragging over a distance beginning from the first location, such that the dragging represents substantially continual user contact from the first location over the distance. Also, after the dragging occurs over a threshold distance, displaying a second group of icons in an icon display region, such that each icon of the second icon group is associated with an application that is executable on the mobile terminal.

22 Claims, 14 Drawing Sheets

(51) Int. Cl.
*G06F 3/04886* (2022.01)
*G06F 3/0482* (2013.01)

(56) References Cited

U.S. PATENT DOCUMENTS

| | | | | |
|---|---|---|---|---|
| 8,266,550 | B1 * | 9/2012 | Cleron | G06F 1/1633 345/173 |
| 8,589,374 | B2 * | 11/2013 | Chaudhri | G06F 3/04817 707/706 |
| 8,707,175 | B2 * | 4/2014 | Lee | G06F 3/04817 715/702 |
| 9,389,770 | B2 | 7/2016 | Bang | |
| 9,513,801 | B2 * | 12/2016 | Chaudhri | G06F 3/04883 |
| 9,569,093 | B2 * | 2/2017 | Lipman | G06F 3/03545 |
| 9,619,143 | B2 * | 4/2017 | Herz | G06F 3/04817 |
| 9,916,060 | B2 * | 3/2018 | Hosein | G06F 3/04817 |
| 10,209,872 | B2 * | 2/2019 | Glover | G06F 3/0482 |
| 10,324,584 | B2 * | 6/2019 | Giacomini | G06F 3/04817 |
| 2003/0098891 | A1 * | 5/2003 | Molander | 345/841 |
| 2004/0142720 | A1 * | 7/2004 | Smethers | 455/550.1 |
| 2005/0071771 | A1 * | 3/2005 | Nagasawa et al. | 715/765 |
| 2006/0020904 | A1 * | 1/2006 | Aaltonen et al. | 715/850 |
| 2007/0157089 | A1 * | 7/2007 | Van Os et al. | 715/702 |
| 2007/0157099 | A1 * | 7/2007 | Haug | G06F 3/0486 715/769 |
| 2008/0165147 | A1 | 7/2008 | Christie et al. | |
| 2008/0168382 | A1 * | 7/2008 | Louch et al. | 715/781 |
| 2008/0189645 | A1 * | 8/2008 | Kapanen et al. | 715/777 |
| 2008/0207188 | A1 * | 8/2008 | Ahn et al. | 455/418 |
| 2009/0064055 | A1 * | 3/2009 | Chaudhri et al. | 715/863 |
| 2009/0228820 | A1 * | 9/2009 | Kim | G06F 3/04817 715/769 |
| 2009/0282360 | A1 * | 11/2009 | Park et al. | 715/786 |
| 2009/0313567 | A1 * | 12/2009 | Kwon et al. | 715/769 |
| 2010/0095207 | A1 * | 4/2010 | Bonnat | G06F 3/0482 715/702 |
| 2010/0105443 | A1 * | 4/2010 | Vaisanen | G06F 3/0486 455/566 |
| 2011/0010672 | A1 * | 1/2011 | Hope | G06F 3/04817 715/841 |
| 2011/0016390 | A1 * | 1/2011 | Oh et al. | G06F 3/0482 715/702 |
| 2011/0225524 | A1 * | 9/2011 | Cifra | G06F 3/04883 715/763 |
| 2012/0262398 | A1 * | 10/2012 | Kim | G06F 3/041 345/173 |

FOREIGN PATENT DOCUMENTS

| | | |
|---|---|---|
| CN | 101436113 | 5/2009 |
| CN | 101452365 | 6/2009 |
| JP | 2001-282405 | 10/2001 |
| KR | 10-2008-0097789 | 11/2008 |

OTHER PUBLICATIONS

U.S. Appl. No. 12/972,330, Office Action dated Dec. 19, 2012, 22 pages.
U.S. Appl. No. 12/972,330, Office Action dated Jul. 31, 2014, 14 pages.
U.S. Appl. No. 12/972,330, Office Action dated Jan. 30, 2015, 18 pages.
U.S. Appl. No. 12/972,330, Office Action dated Oct. 7, 2015, 17 pages.

* cited by examiner

MOBILE TERMINAL AND METHOD OF CONTROLLING THE OPERATION OF THE MOBILE TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[Pursuant] *This application is a reissue of U.S. Pat. No. 9,389,770, which issued on Jul. 12, 2016, from U.S. patent application Ser. No. 12/972,330, filed on Dec. 17, 2010, which pursuant* to 35 U.S.C. § 119(a), [this application] claims the benefit of earlier filing date and right of priority to Korean Application No. 10-2010-0035987, filed on Apr. 19, 2010, the contents of which are *all* hereby incorporated by reference herein in their entirety.

FIELD OF THE INVENTION

The present invention relates to a mobile terminal, and in particular, to displaying items and icons on a display of a mobile terminal.

DESCRIPTION OF THE RELATED ART

Mobile terminals are portable devices capable of performing voice/video calls, inputting and outputting information, and/or storing data. As the functions of mobile terminals diversify, an increasing number of mobile terminals have been equipped with various complicated functions, such as capturing photos and moving images, playing music files and moving image files, providing games, receiving broadcast programs, and providing wireless Internet services, and have thus evolved into multifunctional multimedia players.

However, as the functions of mobile terminals diversify, the menu structure for controlling various operations performed by mobile terminals has become complicated, and the number of icons for executing certain functions of mobile terminals has increased, which is apparent in the case of smart phones. In particular, after booting smart phones, icons for executing basic functions and icons corresponding to downloaded applications are often displayed together on an idle screen or a main screen.

If there are too many icons to be displayed all at once on a display screen, users may be required to perform several manipulations such as scrolling a display screen in order to search for and execute any desired icons. In addition, as the number of icons that need to be displayed on a main screen increases, the number of programs and/or the amount of data that should be present in random access memories of mobile terminals increases, and thus, the processing speed of mobile terminals decreases.

Therefore, it may be useful to develop ways to effectively arrange icons to be displayed on a main screen so as to search for and execute any desired icons with only a few manipulations and improve the processing speed of mobile terminals.

SUMMARY

In accordance with an embodiment, a method of displaying items on a mobile terminal includes displaying a first icon group of a plurality of icons on a display of the mobile terminal, such that each icon of the first icon group is associated with an application that is executable on the mobile terminal. Also performed is detecting user contact at a first location of the display relative to a displayed location of a particular icon of the first icon group and detecting further user contact representing a dragging over a distance beginning from the first location, such that the dragging represents substantially continual user contact from the first location over the distance. Also, after the dragging occurs over a threshold distance, displaying a second group of icons in an icon display region, such that each icon of the second icon group is associated with an application that is executable on the mobile terminal.

In accordance with an embodiment, a mobile terminal includes a display configured to display a first icon group of a plurality of icons on a display of the mobile terminal, such that each icon of the first icon group is associated with an application that is executable on the mobile terminal A controller is also included, such that it is configured to detect user contact at a first location of the display relative to a displayed location of a particular icon of the first icon group; detect further user contact representing a dragging over a distance beginning from the first location, wherein the dragging represents substantially continual user contact from the first location over the distance; and wherein after the dragging occurs over a threshold distance, the controller is further configured to cause the display to display a second group of icons in an icon display region, wherein each icon of the second icon group is associated with an application that is executable on the mobile terminal.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, an electronic-book (e-book) reader, and the like. In this disclosure, the terms 'module' and 'unit' can be used interchangeably.

Figure 1:
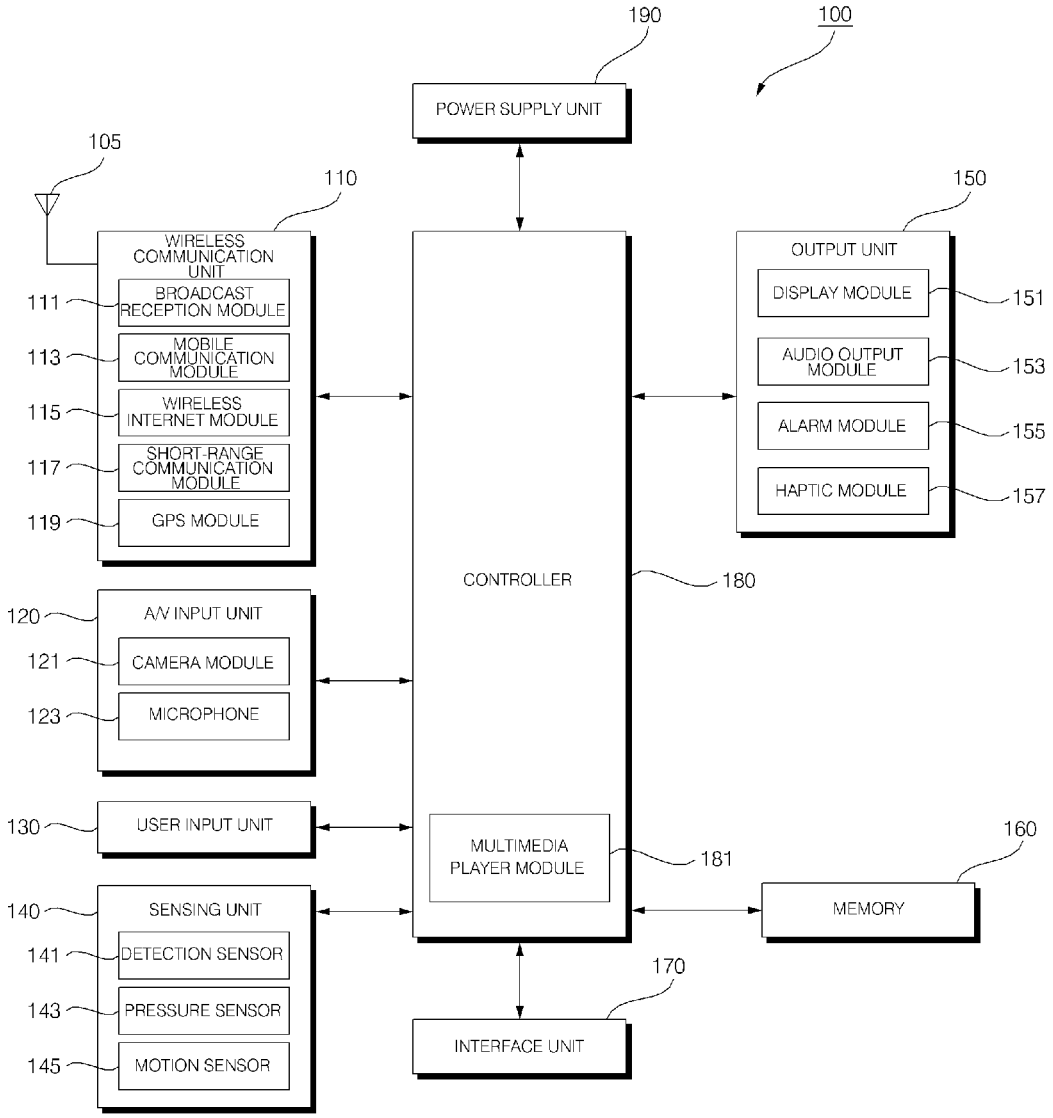
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HS-DPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may detect an approaching object or whether there is an object nearby the mobile terminal 100 without mechanical contact. More specifically, the detection sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

Generally, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of an LCD, a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. Various embodiments presented herein can be implemented using nearly any type of mobile terminal, such as a folder-type, a bar-type, a swing-type and a slider-type mobile terminal. However, for convenience, it is assumed that the mobile terminal 100 is a bar-type mobile terminal equipped with a touch screen.

Figure 2:
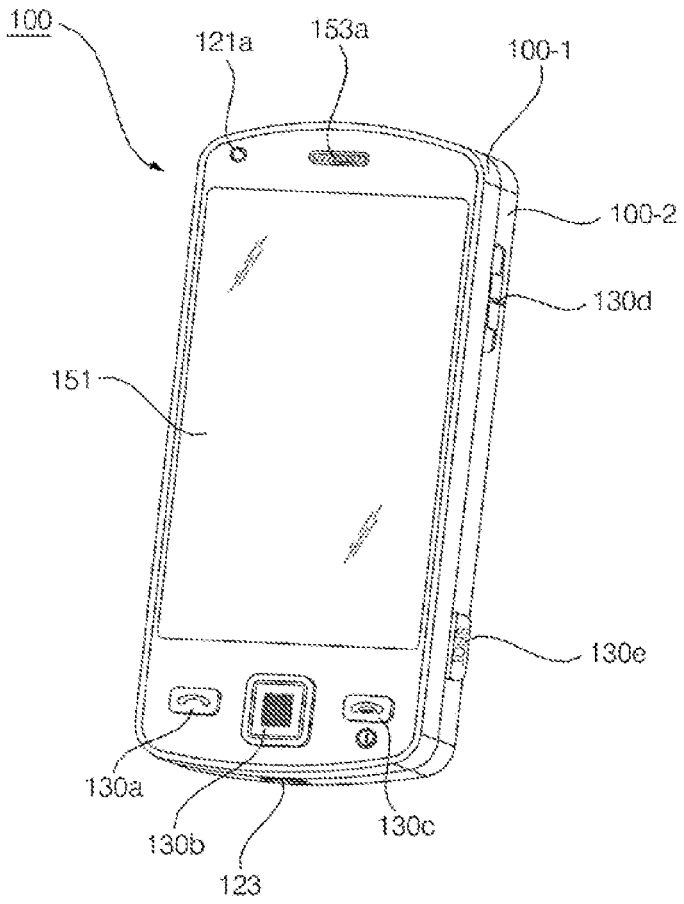
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, a first camera 121a, and first through third user input modules 130a through 130c may be disposed in the main body of the mobile terminal 100, and particularly, in the front case 100-1. Fourth and fifth user input modules 130d and 130e and the microphone 123 may be disposed on one side of the rear case 100-2.

If a touch pad is configured to overlap the display module 151 and thus to form a mutual layer structure, the display module 151 may serve as a touch screen. Thus, the user can enter various information simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through fifth user input modules 130a through 130e and sixth and seventh user input modules 130f and 130g may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first through third user input modules 130a through 130c may be used to make or receive a call, move a mouse pointer, scroll a display screen, and enter various commands such as 'start', 'end', and 'scroll' to the mobile terminal 100, the fourth user input module 130d may be used to select an operating mode for the mobile terminal 100, and the fifth user input module 130e may serve as a hot key for activating certain functions of the mobile terminal 100.

The first user input module 130a may allow the user to, the second user input module 130b may be used to enter various numerals, characters or symbols, and the third and fourth user input modules 130c and 130d may be used as hot keys for activating certain functions of the mobile terminal 100.

Figure 3:
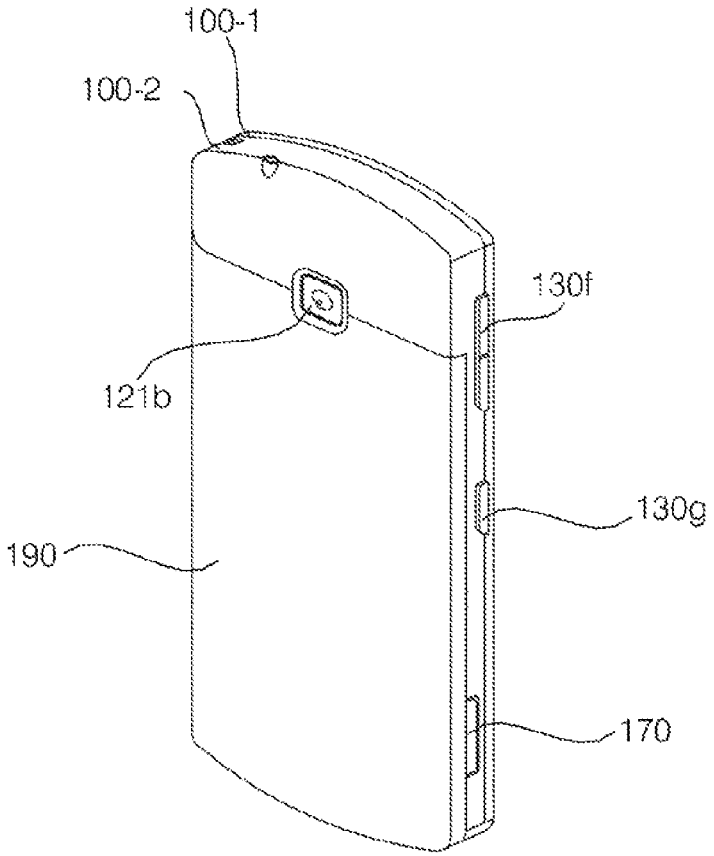
FIG. 3 illustrates a rear perspective view of the mobile terminal shown in FIG. 2.

FIG. 3 illustrates a rear perspective view of the mobile terminal 100. Referring to FIG. 3, a second camera 121b may be disposed at the rear of the rear case 100-2. The sixth and seventh user input modules 130f and 130e and the interface unit 170 may be disposed on one side of the second body 100B.

The second camera 121b may have a different photographing direction from the first camera 121a shown in FIG. 2. In addition, the first and second cameras 121a and 121b may have different resolutions.

A camera flash and a mirror may be disposed near the second camera 121b. The camera flash may be used to illuminate a subject when the user attempts to capture an image of the subject with the second camera 121b. The mirror may be used for the user to prepare himself or herself for taking a self shot.

A second audio output module (not shown) may be additionally provided in the rear case 100-2. The second audio output module may realize a stereo function along with the first audio output module 153a. The second audio output module may also be used in a speaker-phone mode.

The interface unit 170 may serve as a pathway for allowing the mobile terminal 100 to exchange data with an external device.

Not only an antenna 105 for making or receiving a call but also an antenna 105 for receiving a broadcast signal may be disposed on one side of the rear case 100-2. The antennas may be installed so as to be able to be retracted from the rear case 100-2.

The power supply unit 190, which supplies power to the mobile terminal 100, may be disposed in the rear case 100-2. The power supply unit may be a rechargeable battery and may be coupled to the rear case 100-2 so as to be attachable to or detachable from the rear case 100-2.

The second camera 121b and the other elements that have been described as being provided in the rear case 100-2 may be provided in the front case 100-1. In addition, the first camera 121a may be configured to be rotatable and thus to cover the photographing direction of the second camera 121b. In this case, the second camera 121b may be optional.

Figure 4:
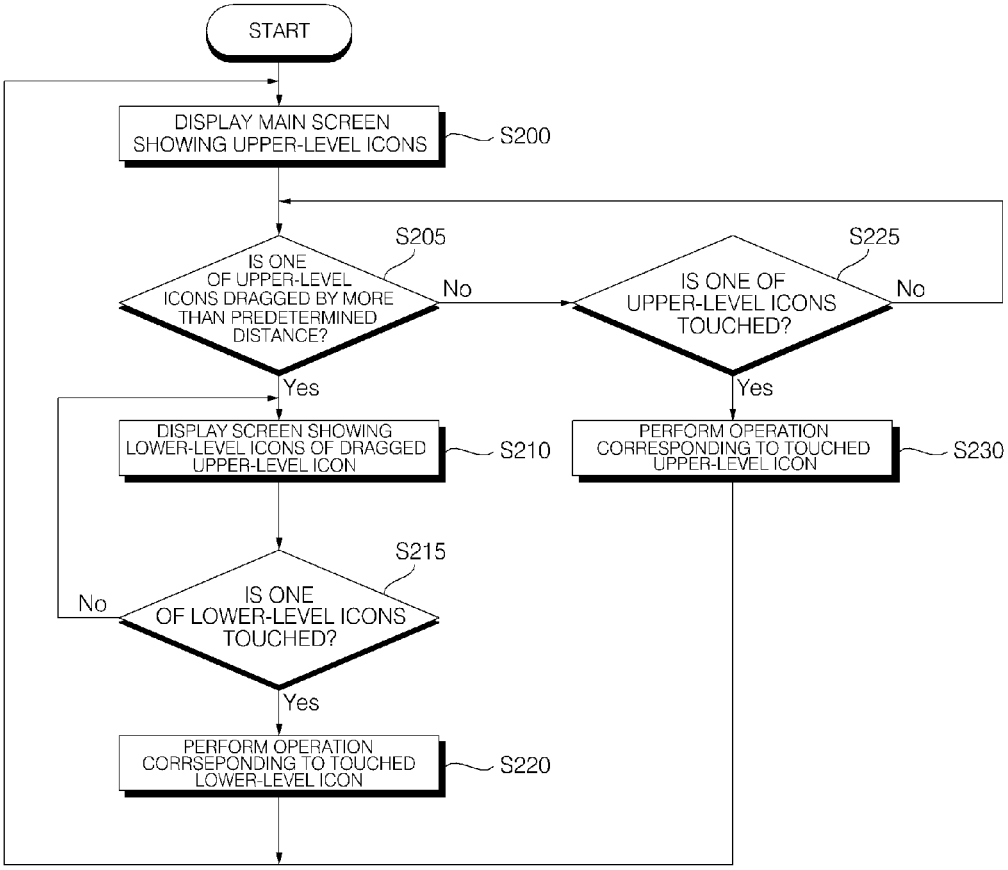
FIG. 4 is a flowchart depicting a method of controlling the operation of a mobile terminal according to an embodiment of the present invention.

FIG. 4 is a flowchart depicting a method of controlling the operation of a mobile terminal according to an embodiment of the present invention. Referring to FIG. 4, block S200 includes displaying a main screen showing a predefined number of upper-level icons on the display module, such as display module 151. The main screen may be a display screen that can be displayed when the booting of the mobile terminal is complete or when the mobile terminal is booted and released from a lock state. The upper-level icons may include icons frequently used by the user or icons selected by the user. That is, icons frequently used or selected by the user may be set to be displayed on the main screen as the upper-level icons.

In addition to basic icons, icons corresponding to applications downloaded from web stores may be displayed on the main screen. However, if too many icons are displayed on the main screen at the same time, the number of programs or the amount of data that should be present in the random access memory (RAM) of the mobile terminal may increase, and thus, the processing speed of the mobile terminal may decrease. To minimize or eliminate this and other issues, only a predefined number of icons including, for example, the icons frequently used or selected by the user, may be displayed on the main screen.

Icon-related information (such as a brief description or the current state of use of each of the upper-level icons) may be displayed near each of the upper-level icons. The icon-related information may be modified or edited by the user.

Alternatively, the user may configure various other information, icon name, or memo to be displayed near each of the upper-level icons, instead of the icon-related information. If the icon-related information is selected in response to a touch input, for example, a character input window may be displayed, and thus, the user may modify or edit the icon-related information using the character input window.

If one of the upper-level icons is dragged for more than a predetermined (e.g., threshold) distance (S205), then the display screen may show a group of lower-level icons, if any, of the corresponding upper-level icon on the display module (S210). On the other hand, if one of the upper-level icons is dragged less than the predetermined distance, the corresponding upper-level icon may be moved to a position where it has been dragged.

Alternatively, if one of the upper-level icons is dragged toward a certain direction, a group of lower-level icons, if any, of the corresponding upper-level icon may be displayed. On the other hand, if one of the upper-level icons is dragged toward a direction other than the certain direction, the corresponding upper-level icon may be moved to a position where it has been dragged.

If one of the upper-level icons is dragged in a predetermined manner, the dragged upper-level icon may be displayed differently from the other non-dragged upper-level icons so as to be easily distinguishable. For example, the dragged upper-level icon may be highlighted, whereas the other non-dragged upper-level icon may be blurred or otherwise distinguished.

A group of lower-level icons to be displayed when one of the upper-level icons is dragged in a predetermined manner may be set in advance.

The lower-level icons displayed in operation 5210 may be icons for executing sub-menu functions of the upper-level icon selected in operation 5205 or may be sub-folder icons of the upper-level icon dragged by more than the predetermined distance in operation 5205.

The length or color of icon-related information of an upper-level icon may vary according to the number of lower-level icons that belong to the upper-level icon. Therefore, the user can determine how many lower-level icons belong to an upper-level icon based on icon-related information of the upper-level icon.

If one of the lower-level icons displayed in operation S210 is touched (S215), a predefined operation corresponding to the touched lower-level icon may be performed (S220).

If one of the upper-level icons displayed on the main screen is touched, instead of being dragged more than the predetermined distance (S225), a predefined operation corresponding to the touched upper-level icon may be performed (S230). That is, some of the upper-level icons displayed on the main screen can be readily executed simply by being touched.

According to this embodiment, it is possible to execute most or all of the functions of the mobile terminal 100 with only a few manipulations. In addition, it is possible to improve the processing speed of the mobile terminal by restricting the number of icons that are displayed on the main screen.

Figure 5:
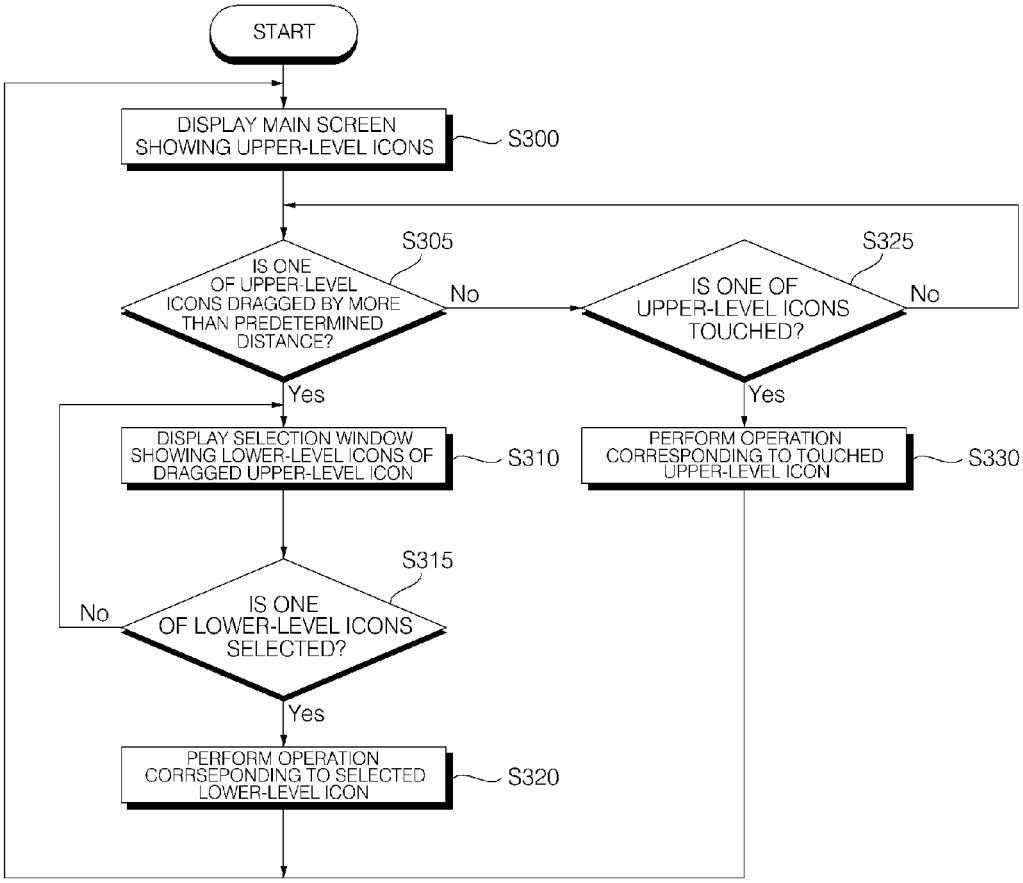
FIG. 5 is a flowchart depicting a method of controlling the operation of a mobile terminal according to further embodiments of the present invention.

FIG. 5 is a flowchart depicting a method of controlling the operation of a mobile terminal according to further embodiments of the present invention. Referring to FIG. 5, operations S300, S325 and S330 may be implemented in the same or similar manner as that described with regard to FIG. 4, and thus, further description thereof will be omitted.

In operation S305, if one of a plurality of upper-level icons displayed on a main screen is dragged by more than a predetermined distance, a selection window may be displayed from which the user can choose one of a number of lower-level icons, if any, of the dragged upper-level icon on the display module (S310). The selection window may be displayed at the top or bottom of the dragged upper-level icon as a popup window, for example.

In operation S315, if one of the lower-level icons included in the selection window is selected by being touched, a predefined operation corresponding to the selected lower-level icon may be performed (S320). According to the FIG. 5 embodiment, each of the upper-level icons may be executed without the need to switch from one display screen to another display screen. The embodiments of FIGS. 4 and 5, for example, will now be described in further detail with reference to FIGS. 6 through 14.

Figure 6:
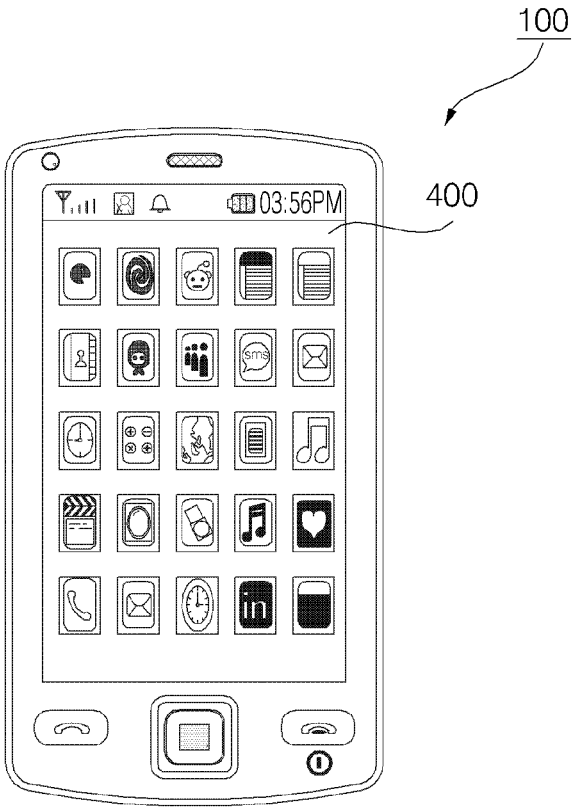
FIGS. 6 and 7 depict icons of a main screen of a mobile terminal according to embodiments of the present invention.
Figure 7:
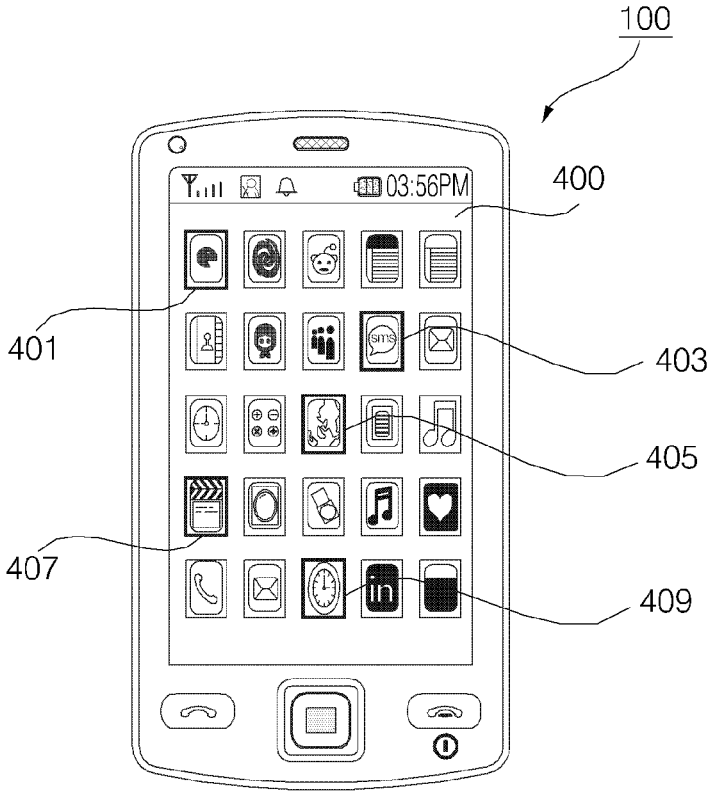
Figure 8:
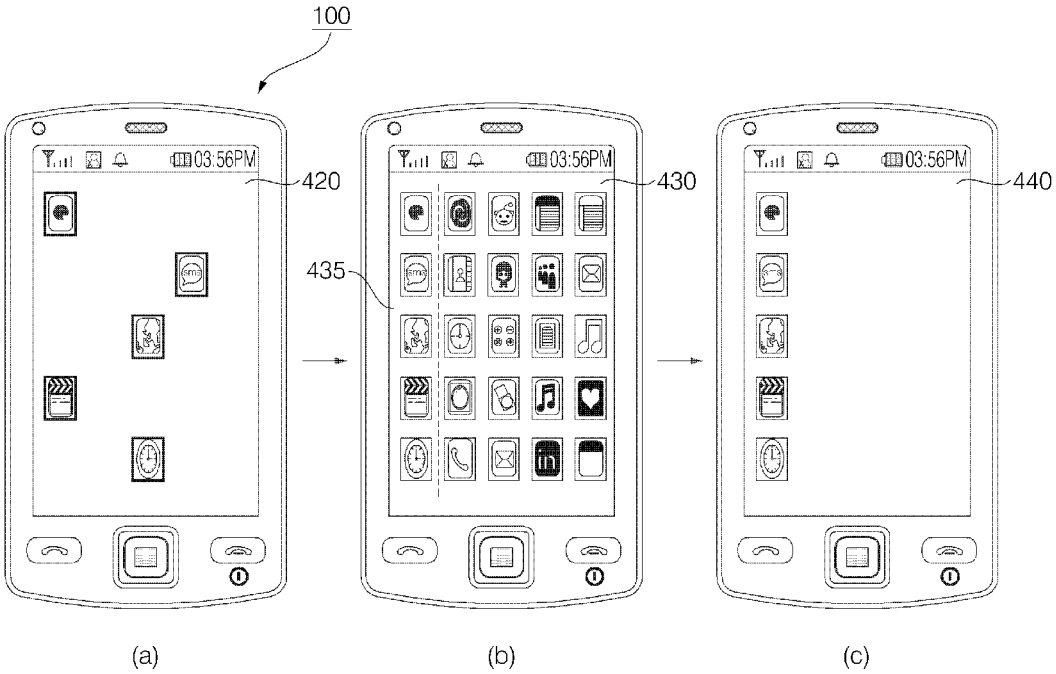
FIGS. 8 through 10 depict various display screens of a mobile terminal operating, for example, in accordance with the various embodiments presented with regard to the method of FIG. 4.
Figure 9:
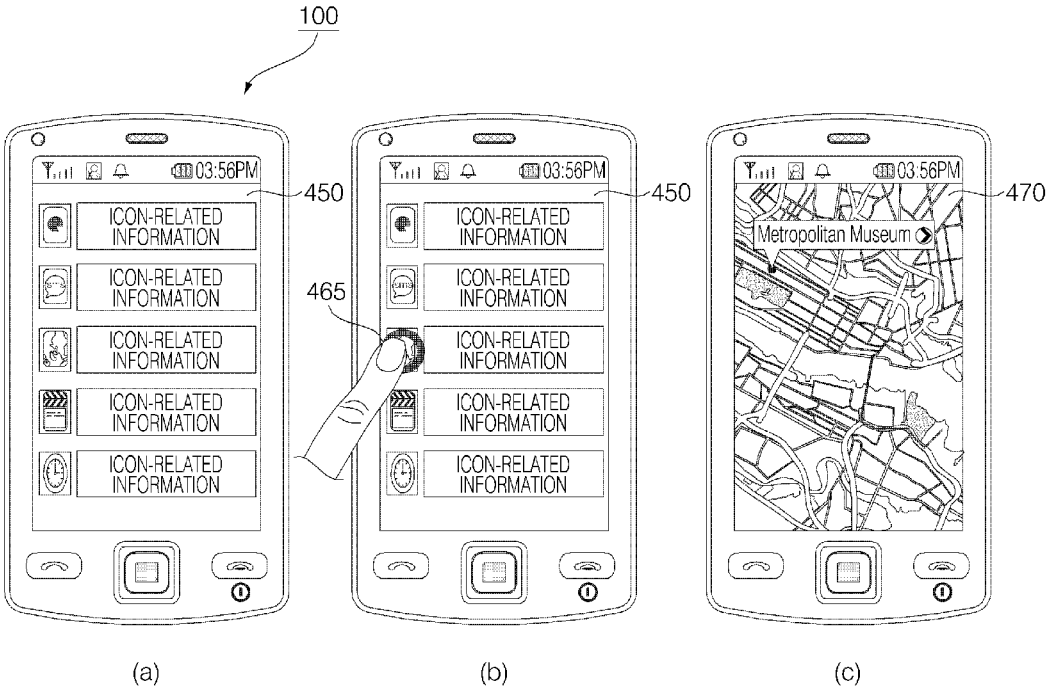
Figure 10:
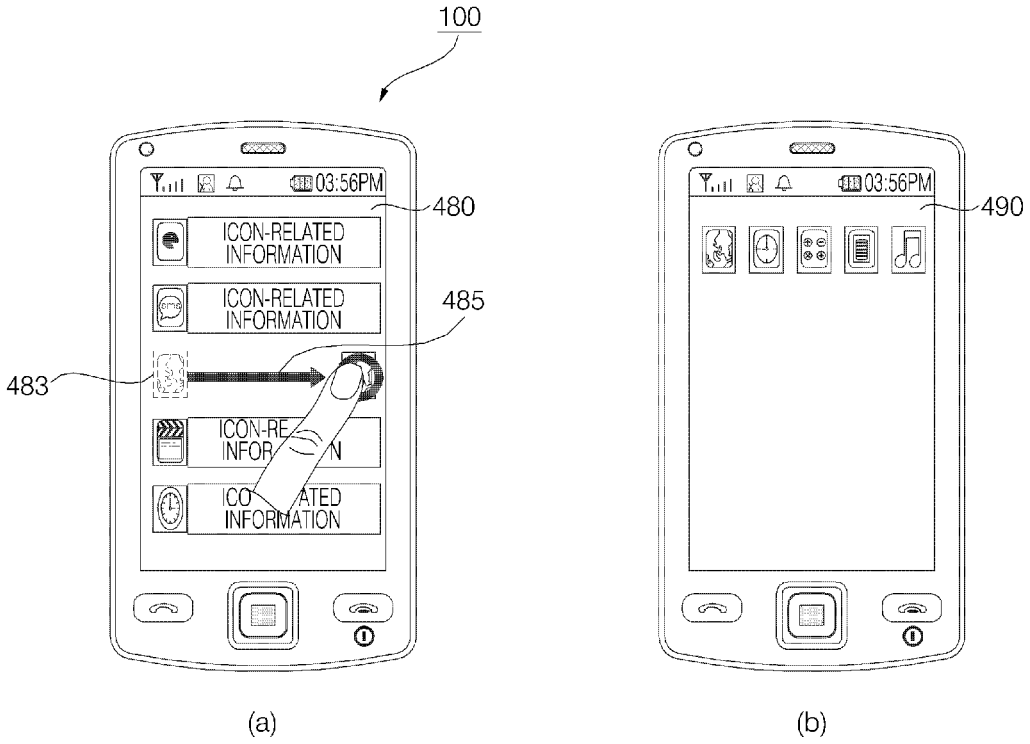

FIGS. 6 and 7 depict icons of a main screen of a mobile terminal according to embodiments of the present invention. In FIG. 6, basic icons for executing basic functions of the mobile terminal 100 may be displayed on a typical main screen 400 together with icons corresponding to applications downloaded from various web stores or obtained from other sources. If there are too many icons to be displayed all at once, or the number of icons otherwise exceeds a threshold, the user may scroll the main screen (e.g., sideways) in order to search for and execute any desired icon.

Consider now the scenario in which not all the icons displayed on the main screen 400 may satisfy a predetermined condition (e.g., regarding the frequency of use). For example, referring to FIG. 7, only a few icons 401, 403, 405, 407 and 409 may satisfy the predetermined condition regarding the frequency of use.

FIGS. 8 through 11 depict various display screens of a mobile terminal operating, for example, in accordance with the various embodiments presented with regard to the method of FIG. 4. In particular, FIG. 8(a) shows a display screen 420 on which a plurality of upper-level icons are displayed. In this example, these icons satisfy a condition regarding the frequency of use or are selected by the user and may also be selected as upper-level icons.

Next, a main screen may be configured using such upper-level icons. More specifically, referring to FIG. 8(b), the icons that satisfy the above-noted predetermined condition may be arranged in a particular location, such a row 435 along one edge (e.g., a left edge) of a display screen 430. Icons that do not satisfy the predetermined condition may be arranged on the right side of the icons (or other location) that are included in row 435.

In the example of FIG. 8(c), the icons that do not satisfy the predetermined condition may be deleted from the display screen 420, thereby obtaining a main screen 440 that only includes (e.g., excludes other icons) the icons that satisfy the predetermined condition. Since only certain icons are selected as upper-level icons and are thus displayed on the main screen 440, it is possible to simplify the configuration of the main screen 440.

A number of lower-level icons of each upper-level icon may be classified into one or more function groups according to their functions, for example, into a fun entertainment function group including game and DMB features and a call-related function group including a call feature, a short message service (SMS) feature, a multimedia messaging service (MMS) feature and a long message service (LMS) feature. A number of lower-level icons of each upper-level icon may be configured as sub-folders of a corresponding upper-level icon, and may thus be able to be easily selected by the user.

Referring to FIG. 9(a), icon-related information such as a brief description or the frequency of use of each upper-level icon and information regarding a number of lower-level icons of each upper-level icon may be displayed on a main screen 450.

Referring to FIG. 9(b), if one of a plurality of upper-level icons displayed on the main screen 450 is touched 465, and the touched upper-level icon does not have any lower-level icons to choose from and can thus be readily executed, an operation corresponding to the touched upper-level icon may be performed. Referring to FIG. 9(c), an example of this execution is shown in display screen 470.

Referring to FIGS. 10(a) and 10(b), if one of a plurality of upper-level icons displayed on a main screen 480 is dragged 485 (e.g., to the right), a display screen 490 showing a number of lower-level icons of the dragged upper-level icon 483 may be displayed. Then, the user can select and execute one of the lower-level icons from the display screen 490.

Figure 11:
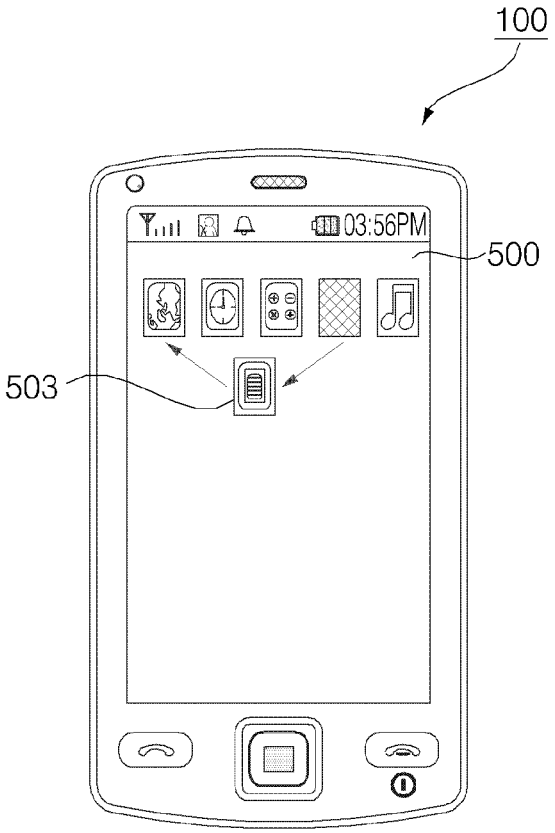
FIGS. 11 and 12 depict display screens showing examples of an icon drag-and-drop.
Figure 12:
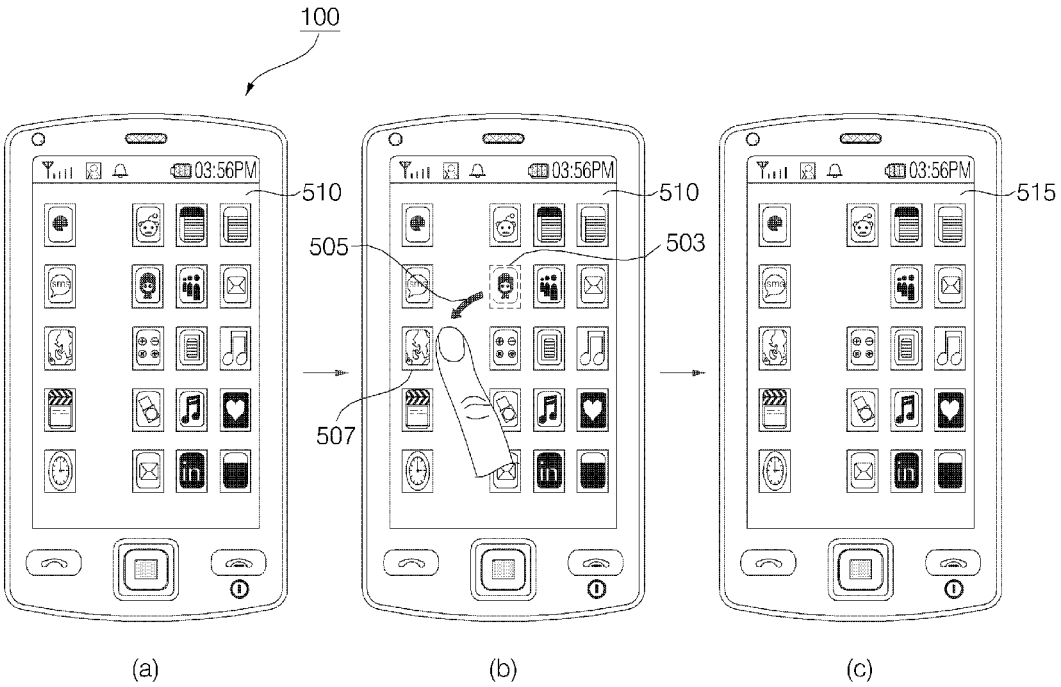

FIGS. 11 and 12 depict display screens showing examples of icon drag-and-drop operations. Referring to FIG. 11, an icon 503 may be moved from one position to another on a display screen 500, and a new icon may be added to the display screen 500 through a simple drag-and-drop. More specifically, if an icon is dragged by more than a predetermined distance (e.g., a threshold distance), a number of lower-level icons, if any, of the icon may be displayed. On the other hand, if an icon is dragged by less than the predetermined distance, the icon may be moved to a position where it has been dragged.

Referring to FIG. 12(a), a plurality of upper-level icons are shown displayed on an icon setting screen 510 together with other icons that can be set as lower-level icons, i.e., lower-level icon candidates. The icon setting screen 510 may be provided by a predetermined menu. The upper-level icons may be configured to be displayed along with the lower-level icon candidates, instead of icon-related information, in accordance with a predefined user input. If there are too many lower-level icon candidates to be displayed all at once, the icon setting screen 510 may be configured to be able to be scrolled (e.g., sideways). When the icon setting screen 510 is scrolled, the upper-level icons may remain fixed at their initial positions so that only the lower-level icon candidates can be scrolled through.

Referring to FIG. 12(b), if one of the lower-level icon candidates 503 is dragged 505 over an upper-level icon 507, the icon 503 may be set as a lower-level icon of the upper-level icon 507. Then, referring to FIG. 12(c), a display screen 515 may be obtained by deleting the icon 503 from the icon setting screen 510. Thereafter, icon-related information of the upper-level icon 507 may be updated according to the addition of the icon 503 as a new lower-level icon of the icon 507. If desired, the icon-related information of the upper-level icon 507 may be modified or edited in accordance with a user command. In this manner, an icon may be set as a lower-level icon of an upper-level icon by dragging the icon over the upper-level icon.

Figure 13:
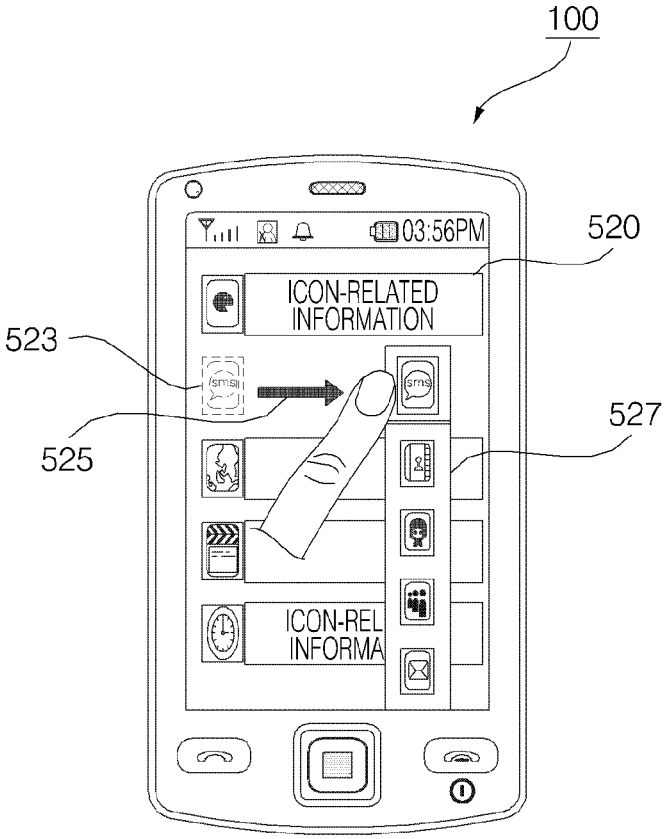
FIGS. 13 and 14 depict various display screens of a mobile terminal operating, for example, in accordance with the various embodiments presented with regard to the method of FIG. 5.
Figure 14:
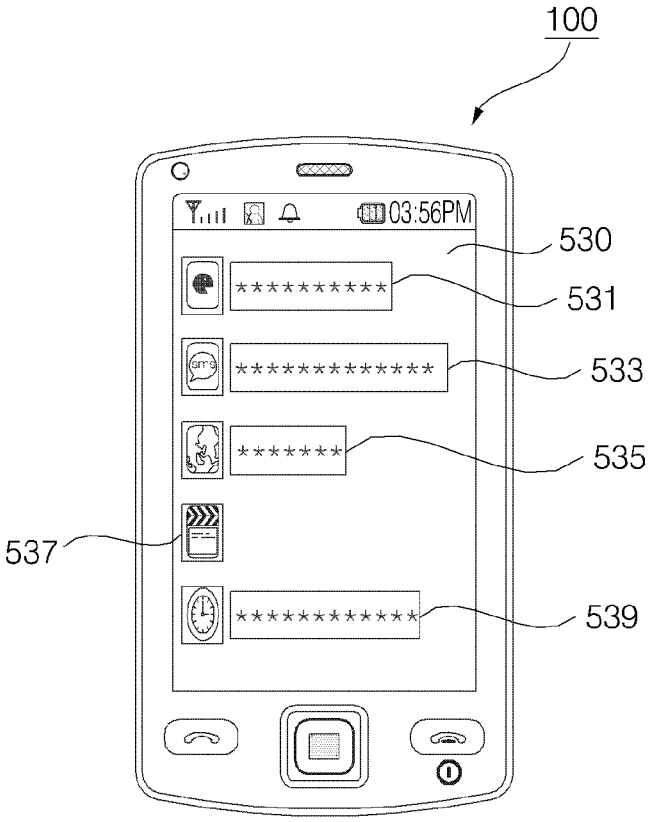

FIGS. 13 and 14 depict various display screens of a mobile terminal operating, for example, in accordance with the various embodiments presented with regard to the method of FIG. 5. Referring to FIG. 13, if one of a plurality of upper-level icons displayed on a main screen 520 is dragged 525 (e.g. to the right) a selection window 527 showing a number of lower-level icons of the dragged upper-level icon may be displayed (e.g., at the bottom of the dragged upper-level icon) as a popup window. Then, the user can touch and execute one of the lower-level icons from the selection window 527. The lower-level icons may be configured not to be readily executed after being selected by a touch of the selection window 527. In this case, the user can readily execute one of the lower-level icons from the selection window 527 via a downward or other directional drag within the selection window 527.

In more detail as a further example, FIG. 13 shows displaying a first icon group (e.g., on the left side of the screen) of a plurality of icons on the display of the mobile terminal 100. In general, each icon of the first icon group is associated with an application (e.g., messaging, phone call, clock, and the like) that is executable on the mobile terminal. As indicated, user contact may occur at a first location of the display (e.g., dashed lines 523) relative to a displayed location of a particular icon 523. Further detected is user contact representing a dragging 525, for example, may occur over a distance beginning from the first location. Generally, the dragging represents substantially continual user contact from the first location over the distance. After the dragging occurs over a threshold distance (which can be system or user defined), a second group of icons (e.g., icons 527) are displayed in an icon display region (e.g., region 527). In this example, each icon of the second icon group may be associated with an application that is executable on the mobile terminal.

Referring to FIG. 14, the length or color of icon-related information displayed on a main screen 530 may vary according to the number of lower-level icons of each upper-level icon, as indicated by reference numerals 531, 533, 535 and 539. For an upper-level icon having no lower-level icons, no icon-related information may be displayed, as indicated by reference numeral 537. Therefore, it is possible to easily determine the number of lower-level icons of each upper-level icon.

As noted previously, various embodiments can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing various embodiments can be constructed by one of ordinary skill in the art based upon the teachings herein.

As described above, only a few icons that are selected based on their frequency of use or other parameter or condition (e.g., type, size, date of creation, and the like) and/or in accordance with a user command, may be displayed on a main screen. Then, if one of the icons is dragged by more than a predetermined distance, a number of lower-level icons, if any, of the dragged icon may be displayed. Therefore, it is possible to easily execute most of the functions of a mobile terminal with a few manipulations. Therefore, it is possible to simplify the configuration of a main screen, reduce the number of programs or the amount of data that should be present in a RAM of a mobile terminal and thus improve the processing speed of a mobile terminal.

Although embodiments may be implemented using the exemplary series of operations described herein, additional or fewer operations may be performed. Moreover, it is to be understood that the order of operations shown and described is merely exemplary and that no single order of operation is required. In addition, the foregoing embodiments are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of displaying items on a display of a mobile terminal, the method comprising:

displaying a first icon group including a plurality of icons on the display, wherein *each of* the plurality of icons are displayed [at] *as being aligned with a* respective [locations] *one of a plurality of visibly defined rows* on the display*, and wherein a first icon of the plurality of icons of the first icon group is displayed at a first displayed location on the display and the first icon is to be touched*;

*displaying simultaneously, for each of the plurality of icons, respective icon related information within a respective one of the plurality of visibly defined rows;* performing a predefined operation corresponding to [a] *the* touched *first* icon of the plurality of icons of the first icon group in response to a first user input*, which is a touch input,* that is received at the display, wherein the first user input is received while the first icon group is displayed;

displaying [a] *at least one* second icon [group including at least one icon] in response to a second user input received at the display, wherein the second user input, which is different from the first user input, comprises *a* dragging *touch input* more than a threshold distance [beginning from a] *received at a location that corresponds to the* first displayed location of [a] *the* first icon of the plurality of icons of the first icon group, [at least one icon of] *wherein the at least one second icon is different from the touched first icon of the first icon group and* the *at least one* second icon [group] represents a predefined operation that can be performed at the mobile [terminal, and wherein the at least one icon of the second icon group is different from the touched icon of the first icon group] *terminal*; and after the dragging [more than the threshold distance] *touch input* and while user contact is maintained *at an area corresponding to the visibly defined row associated with the first icon and* at the display as part of the second user input[.]*:

continuing the displaying of remaining icons of the plurality of icons of the first icon group [at the respective locations of] *as being aligned with a respective one of the plurality of visibly defined rows on* the display [with],

*continuing the displaying, for the remaining icons of the plurality of icons, respective icon related information within a respective one of the plurality of visibly defined rows,*

*continuing the displaying of* the *at least one* second icon [group and], no longer displaying the first icon of the plurality of icons of the first icon group at the first displayed location, *and displaying the first icon at a second displayed location which is different than the first displayed location.*

2. The method of claim 1, wherein each icon of the first icon group is an upper-level icon, and [each icon of] the *at least one* second icon [group] is a lower-level icon.

[3. The method of claim 1, wherein the predefined operation of each icon of the second icon group represents a separate application that is executable at the mobile terminal.]

4. The method of claim 1, wherein the *at least one* second icon [group comprises] *is one of* an icon related to a call operation [and] *or* an icon related to a message operation.

[5. The method of claim 1, wherein each icon of the first icon group includes icon information in an icon information region of the corresponding icon.]

6. The method of claim [5] *1*, further comprising:

modifying or editing the icon *related* information *associated with one of the plurality of icons of the first icon group* in accordance with a user input.

7. The method of claim 1, further comprising:

displaying a dragged icon on the display at locations that correspond to the dragging *touch input* of the received second user input, wherein display characteristics of the dragged icon are different from display characteristics of other icons of the first icon group.

8. The method of claim 1, wherein the *at least one* second icon [group] is displayed in response to the second user input reaching the threshold distance.

9. The method of claim 1, wherein the plurality of icons included in the first icon group are displayed as a vertical list.

10. The method of claim 1, further comprising:

displaying, on the display, a screen related to the predefined operation *corresponding to the first icon* in response to the first user input such that the first icon group is not displayed after receiving the first user input.

[11. The method of claim 1, wherein one icon of the second icon group is an icon included in the first icon group.]

12. The method of claim 1, further comprising:

moving the first icon of the first icon group from the first displayed location to [a different] *the second displayed* location that corresponds with a current location of the second user input.

13. A mobile terminal, comprising:

*a memory storing computer-readable code;* a display; and a [controller] *processor operably coupled to the display and the memory and being* configured to:

[cause] *execute the computer-readable code to control* the display to display a first icon group including a plurality of icons, wherein *each of* the plurality of icons are displayed [at] *as being aligned with a* respective [locations] *one of a plurality of visibly defined rows* on the display, *and wherein a first icon of the plurality of icons of the first icon group is displayed at a first displayed location on the display and the first icon is to be touched*;

*execute the computer-readable code to control the display to display simultaneously, for each of the plurality of icons, respective icon related information within a respective one of the plurality of visibly defined rows;*

*execute the computer-readable code to* perform a predefined operation corresponding to [a] *the* touched *first* icon of the plurality of icons of the first icon group in response to a first user input, *which is a touch input,* that is received at the display, wherein the first user input is received while the first icon group is displayed;

[cause] *execute the computer-readable code to control* the display to display [a] *at least one* second icon [group including at least one icon] in response to a second user input [is] received at the display, wherein the second user input, which is different from the first user input, comprises *a* dragging *touch input* more than a threshold distance [beginning from a] *received at a location that corresponds to the* first displayed location of [a] *the* first icon of the plurality of icons of the first icon group, wherein [at least one icon of] *the at least one second icon is different from the touched first icon of the first icon group and* the *at least one* second icon [group] represents a predefined operation that can be performed at the mobile terminal[, and wherein the at least one icon of the second icon group is different from the touched icon of the first icon group]; and after the dragging [more than the threshold distance] *touch input* and while user contact is maintained *at an area corresponding to the visibly defined row associated with the first icon and* at the display as part of the second user input, *execute the computer-readable code to:*

*control the display to* continue the display of remaining icons of the plurality of icons of the first icon group [at the respective locations of] *as being aligned with a respective one of the plurality of visibly defined rows on* the display[with],

*control the display to continue the display, for the remaining icons of the plurality of icons, respective icon related information within a respective one of the plurality of visibly defined rows,*

*control the display to continue the display of* the *at least one* second icon[group and],

*control the display to* no longer [displaying] *display* the first icon of the plurality of icons of the first icon group at the first displayed location, *and*

*control the display to display the first icon at a second displayed location which is different than the first displayed location.*

14. The mobile terminal of claim 13, wherein each icon of the first icon group is an upper-level icon, and [each icon of] the *at least one* second icon [group] is a lower-level icon.

[15. The mobile terminal of claim 13, wherein the predefined operation of each icon of the second icon group represents a separate application that is executable at the mobile terminal.]

16. The mobile terminal of claim 13, wherein the *at least one* second icon [group comprises] *is one of* an icon related to a call operation [and] *or* an icon related to a message operation.

[17. The mobile terminal of claim 13, wherein each icon of the first icon group includes icon information in an icon information region of the corresponding icon.]

18. The mobile terminal of claim [17] *13*, wherein the [controller] *processor* is further configured to:

*execute the computer-readable code to* modify or edit the icon *related* information *associated with one of the plurality of icons of the first icon group* in accordance with a user input.

19. The mobile terminal of claim 13, wherein the [controller] *processor* is further configured to:

*execute the computer-readable code to* cause the display to display a dragged icon at locations that correspond to the dragging *touch input* of the received second user input, wherein display characteristics of the dragged icon are different from display characteristics of other icons of the first icon group.

20. The mobile terminal of claim 13, wherein the *at least one* second icon [group] is displayed in response to the second user input reaching the threshold distance.

21. The mobile terminal of claim 13, wherein the plurality of icons included in the first icon group are displayed as a vertical list.

22. The mobile terminal of claim 13, wherein the [controller] *processor* is further configured to:

*execute the computer-readable code to* cause the display to display a screen related to the predefined operation *corresponding to the first icon* in response to the first user input such that the first icon group is not displayed after receiving the first user input.

[23. The mobile terminal of claim 13, wherein one icon of the second icon group is an icon included in the first icon group.]

24. The mobile terminal of claim 13, wherein the [controller] *processor* is further configured to:

*execute the computer-readable code to* move the first icon of the first icon group from the first displayed location to [a different] *the second displayed* location that corresponds with a current location of the second user input.

*25. The method of claim 1, wherein each icon of the first icon group includes a symbol that corresponds to an application.*

*26. The method of claim 1, wherein the icon related information respectively associated with each of the plurality of icons of the first icon group is modifiable by a user.*

*27. The method of claim 1, wherein the icon related information respectively associated with each of the plurality of icons of the first icon group includes text.*

*28. A mobile terminal, comprising:*

*a memory storing computer-readable code;*

*a display; and*

*a processor operably coupled to the display and the memory and being configured to:*

*execute the computer-readable code to control the display to display a first item group including a plurality of items, wherein each of the plurality of items are displayed as being aligned with a respective one of a plurality of visibly defined rows on the display, and wherein a first item of the plurality of items of the first item group is displayed at a first displayed location on the display and the first item is to be touched;*

*execute the computer-readable code to control the display to display simultaneously, for each of the plurality of items, respective item related information within a respective one of the plurality of visibly defined rows;*

*execute the computer-readable code to perform a predefined operation corresponding to the touched first item of the plurality of items of the first item group in response to a first user input, which is a touch input, that is received at the display, wherein the first user input is received while the first item group is displayed;*

*execute the computer-readable code to control the display to display at least one second item in response to a second user input received at the display, wherein the second user input, which is different from the first user input, comprises a dragging touch input more than a threshold distance received at a location that corresponds to the first displayed location of the first item of the plurality of items of the first item group, wherein the at least one second item is different from the touched first item of the first item group and the second item represents a predefined operation that can be performed at the mobile terminal; and*

*after the dragging touch input and while user contact is maintained at an area corresponding to the visibly defined row associated with the first item and at the display as part of the second user input, execute the computer-readable code to:*

*control the display to continue the display of remaining items of the plurality of items of the first item group as being aligned with a respective one of the plurality of visibly defined rows on the display,*

*control the display to continue the display of the at least one second item,*

*control the display to no longer display the first item of the plurality of items of the first item group at the first displayed location, and*

*control the display to display the first item at a second displayed location which is different than the first displayed location.*

* * * * *